W. SPARKS.
BRACKET.
APPLICATION FILED MAR. 18, 1921.
1,400,007.
Patented Dec. 13, 1921.
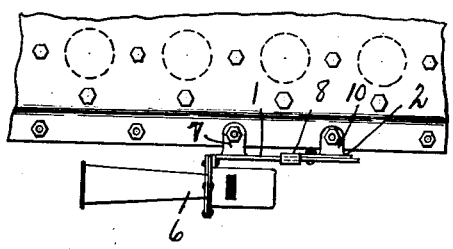
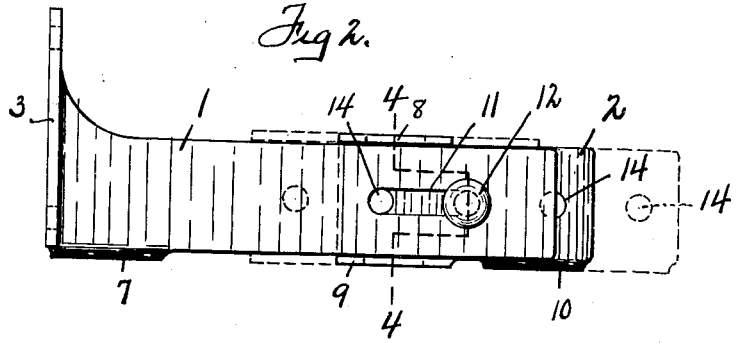
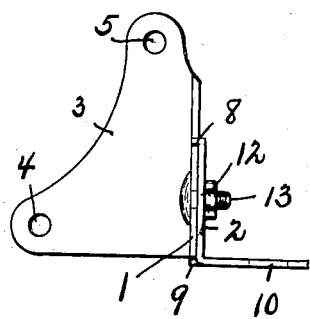
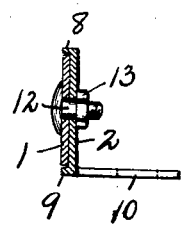
INVENTOR
Wm Sparks
By
Lewson Thompson
ATTORNEYS

UNITED STATES PATENT OFFICE.

WILLIAM SPARKS, OF JACKSON, MICHIGAN, ASSIGNOR TO THE SPARKS-WITHINGTON COMPANY, OF CLEVELAND, OHIO, A CORPORATION OF OHIO.

BRACKET.

1,400,007.        Specification of Letters Patent.     Patented Dec. 13, 1921.

Application filed March 18, 1921. Serial No. 453,233.

*To all whom it may concern:*

Be it known that I, WILLIAM SPARKS, of Jackson, in the county of Jackson, in the State of Michigan, have invented new and useful Improvements in Brackets, of which the following, taken in connection with the accompanying drawings, is a full, clear, and exact description.

This invention relates to certain improvements in brackets designed particularly for supporting a motor-driven horn upon the engine of an automobile beneath the hood, although usable for supporting a horn in various other places.

Experience has demonstrated that practically every make of vehicle requires a bracket of special construction for supporting the horn used as regular equipment, and the same is true of horns sold at retail for installation upon individual cars. Tools and dies for manufacturing special brackets cost the manufacturer of horns many thousands of dollars, and the applicant's company has in the course of its regular manufacture, constructed some sixty or more different forms of brackets for different cars.

It would, therefore, be of great economy in time and money if a single bracket could be produced that would be adapted for supporting the horn upon practically all types and makes of cars, and the bracket of this invention is designed for that purpose and has the advantage of accomplishing that effect.

Other objects and advantages relate to the details of construction of the bracket, as will more fully appear from the following description, taken in connection with the accompanying drawings, in which:

Figure 1 is a top plan view of a horn with bracket attached thereto, illustrating the bracket as secured to a support, as for instance, a portion of a motor vehicle.

Fig. 2 is an elevation of the bracket in one position showing by dotted lines a different adjustment.

Fig. 3 is an end view of the bracket.

Fig. 4 is a cross section on line 4—4, Fig. 2.

The bracket is formed of two sheet metal parts —1— and —2—. The part —1— constitutes the body of the bracket and is formed from a strip of sheet metal of suitable length, preferably of substantially flat form, and has an end portion off-set laterally to form an end plate —3— preferably provided with holes —4— and —5— adapted to receive the ordinary bolts that are used in connecting the two parts of the ordinary diaphragm case of a motor-driven horn —6—. The plate may have its outer edge curved to conform properly to the curvature of the diaphragm case, and the openings, or holes, —4— and —5— are spaced the proper distance to receive the bolts of the horn, as regularly constructed.

The body part —1— at the end opposite that upon which the plate —3— is formed is provided with an elongated slot, which may be of any suitable length to meet the conditions required. Near the end upon which the plate —3— is formed, the part —1— is provided with a laterally off-set portion forming a lug —7—, which projects to the opposite side of the bracket from the projection of the part —3—. This lug —7— lies in a plane substantially perpendicular to the plane of the plate —3—. As illustrated, the plate —3— lies in a vertical plane, while the lug —7— lies in a substantially horizontal plane, and the lug —7— may be provided with an opening to receive a bolt, or other means for attaching the bracket to a suitable support, as a portion of the motor vehicle.

The part —2— is also preferably formed of a strip of thin, flat sheet-metal, and is bent to form at one end a channel of a width adapted to receive the part —1— and grip the same to hold the two parts against movement in a vertical plane. This channel may be formed, as shown, by flanging the upper and lower edges of the part —2— to form the off-set portions —8— and —9—, which are adapted to lie above and below the part —1—. These flanges need not extend throughout the entire length of the strip —2—, but may be formed near one end, as the inner end of the part when the two sections of the bracket are assembled. These flanges extend preferably in the same direction as the extension of the plate —3—, and their formation at one end of the part —2— permits a lug or flange —10— to be formed adjacent the other end, which flange constitutes a lug similar to the lug —7—, and utilizable for the same purpose. It preferably lies in substantially the same plane as the lug —7— and extends in the same direction, and is, therefore, upon the opposite side of the bracket from the plate —3— and in a plane substantially perpendicular to the plate —3—.

One of the parts as —2— is formed with a series of apertures, or holes, along its central portion adapted to be brought into alinement with the slot —11— in the other part to permit the passage of a connecting member, as bolt —12— threaded to receive a nut —13— to lock the parts together in a horizontal plane. Thus, the flanges —8— and —9— and the bolt —12— with its nut —13— form a rigid connection between the parts —1— and —2— and constitute them practically a unitary structure.

It will be apparent that any one of the openings —14— may selectively be brought into registration with the slot —11— and may be moved and positioned at any point along the said slot, and when the bolt —12— and nut —13— are in place, the two parts will be held rigidly in position with any predetermined relative position of the parts —1— and —2—. As illustrative of particular figures, the part —1— may be approximately 6" in length, the part —2— may be approximately 3" in length. The part —2— may be formed with 3 openings spaced equal distances apart. The slot —11— may be an inch and a quarter in length. With this construction, the two parts may be assembled in such manner that the lugs —7— and —10— will be approximately 3⅛" apart from center to center. This will be the closest position of the lugs —7— and —10—. They may then be moved to any relative position up to a distance of 6¼". This permits the positive positioning of the lugs —7— and —10— which constitute the means for attachment to a suitable support, such as the engine, any distance apart from 3¼" up to approximately 6¼" and when the parts —1— and —2— are connected by the bolts —12—, as indicated, a rigid construction is produced which is the equivalent of a single piece bracket.

Although I have shown and described a particular construction as constituting a preferred embodiment of my invention, it will be understood that various changes may be made in the details of construction and form of the parts, without departing from the invention as set forth in the appended claims.

What I claim is:

1. A bracket consisting of an elongated strip of thin metal having a plate-like portion at one end bent at substantially right angles to the strip, a second portion adjacent said end bent at substantially right angles to the strip to form a lug positioned upon the opposite side of the strip from the plate-like portion, and lying in a plane substantially perpendicular to said portion, a second metal strip slidable along the first and having a channel adapted to receive the first, one of said strips formed with an elongated slot and the other with a plurality of openings, any one of which openings is capable of being brought into registration with said slot, means extending through one of said openings and said slot for rigidly securing said strip to a predetermined adjusted position, said second strip having a bent over portion having a lug extending from the same side of the bracket and in substantially the same plane as the first named lug.

2. A bracket comprising two parts adjustable longitudinally with respect to each other, means for holding said parts in various positions of adjustment, each of said parts formed with a laterally extending lug, and one of said parts formed at one end with a horn-attaching flange.

3. A bracket comprising two parts, one of the same formed with an elongated slot and the other with a plurality of openings, any one of which openings is capable of being brought into registration with said slot, each of said parts formed with a laterally extending lug, and one of said parts formed at one end with a horn attaching flange.

4. A bracket comprising two parts adjustable longitudinally with respect to each other, means for holding said parts in various positions of adjustment, one of said parts formed in a channel adapted to slidably receive the other part and prevent relative movement in one direction, each of said parts formed with an integral laterally extending flange constituting an attaching lug, and one of said parts formed at one end with a laterally extending plate-like portion constituting a horn-attaching flange.

5. A bracket comprising two parts, one of the same formed in a channel adapted to slidably receive the other to prevent relative movement in one direction, one of said parts formed with an elongated slot and the other with a series of openings, any one of which is capable of being brought into registration with said slot, each of said parts formed with an integral laterally extending flange constituting an attaching lug, one of said parts formed at one end with a laterally extending plate-like portion, constituting a horn-attaching flange.

In witness whereof I have hereunto set my hand this 28th day of February, 1921.

WILLIAM SPARKS.

Witnesses:
LILLIAN E. WUNDERLICH,
H. M. JOHNSTON.